(12) United States Patent
Knudsen et al.

(10) Patent No.: US 10,252,819 B2
(45) Date of Patent: Apr. 9, 2019

(54) ROCKET LANDING SYSTEMS

(71) Applicants: N. Eric Knudsen, Maple Valley, WA (US); Matthew Niels Knudsen, Maple Valley, WA (US); Andrew Niels Knudsen, Maple Valley, WA (US); Jacob Niels Knudsen, Maple Valley, WA (US)

(72) Inventors: N. Eric Knudsen, Maple Valley, WA (US); Matthew Niels Knudsen, Maple Valley, WA (US); Andrew Niels Knudsen, Maple Valley, WA (US); Jacob Niels Knudsen, Maple Valley, WA (US)

(*) Notice: Subject to any disclaimer, the term of this patent is extended or adjusted under 35 U.S.C. 154(b) by 0 days.

(21) Appl. No.: 16/106,832

(22) Filed: Aug. 21, 2018

(65) Prior Publication Data
US 2019/0055035 A1  Feb. 21, 2019

Related U.S. Application Data

(63) Continuation of application No. 15/097,893, filed on Apr. 13, 2016, now Pat. No. 10,093,433.

(60) Provisional application No. 62/153,433, filed on Apr. 27, 2015.

(51) Int. Cl.
*B64F 1/02* (2006.01)
*B64G 1/62* (2006.01)
*B64G 5/00* (2006.01)

(52) U.S. Cl.
CPC .................. *B64F 1/02* (2013.01); *B64G 1/62* (2013.01); *B64G 5/00* (2013.01); *B64G 2005/005* (2013.01)

(58) Field of Classification Search
CPC ......... B64C 39/02; B64C 39/022; B64F 1/02; B64G 1/62; B64G 5/00; B64G 2005/005
See application file for complete search history.

(56) References Cited

U.S. PATENT DOCUMENTS

| | | | | |
|---|---|---|---|---|
| 2,807,429 A | * | 9/1957 | Hawkins, Jr. | B63B 35/50 114/261 |
| 3,053,479 A | * | 9/1962 | Siegel | F41A 31/00 73/167 |
| 3,309,044 A | * | 3/1967 | Strance | B64F 1/02 244/110 F |
| 4,604,938 A | * | 8/1986 | Kennedy | F42B 35/00 244/110 A |
| 5,667,167 A | * | 9/1997 | Kistler | B64G 1/002 244/110 E |
| 8,162,256 B2 | * | 4/2012 | Goossen | B64C 39/024 244/110 E |

(Continued)

FOREIGN PATENT DOCUMENTS

WO  2007/086055 A1  8/2007

*Primary Examiner* — Justin M Benedik
(74) *Attorney, Agent, or Firm* — Seed IP Law Group LLP

(57) ABSTRACT

A rocket landing stabilization system can include one or more upright support structures such as posts, columns, or walls, from which one or more stabilizing elements can be supported. The stabilizing elements can be used to stabilize a rocket as it lands at a landing site. The rocket landing stabilization system can also include a cradle, funnel, or cone to catch or otherwise support a rocket as it lands at the landing site. The rocket landing stabilization system can be located on land or at sea.

14 Claims, 13 Drawing Sheets

(56) References Cited

U.S. PATENT DOCUMENTS

| | | | |
|---|---|---|---|
| 8,498,756 B1 * | 7/2013 | Sarver | B64G 1/62 |
| | | | 701/1 |
| 8,678,321 B2 * | 3/2014 | Bezos | B64G 1/002 |
| | | | 244/158.9 |
| 9,457,918 B2 * | 10/2016 | Hand | B64G 1/002 |

* cited by examiner

ROCKET LANDING SYSTEMS

BACKGROUND

Technical Field

The present disclosure relates to systems for safely landing a rocket or a rocket booster for reuse, for example, after the rocket booster has been used to launch a payload into outer space.

Description of the Related Art

Since the dawn of the space age and the launching of Sputnik into outer space, various rockets have been used to launch cargo, animals, and humans into outer space. After carrying their payload to the edge of or into outer space, the rockets or rocket boosters have fallen back to earth only to crash into the ground or the ocean and as a result are destroyed. In recent years, some have attempted to bring rocket boosters back safely from their mission so they can be reused. Some believe that reusable rockets or rocket boosters could reduce the costs associated with launching objects into outer space significantly. Example rocket landing techniques are shown and described in U.S. Pat. No. 8,678,321, which is incorporated herein by reference in its entirety.

BRIEF SUMMARY

A rocket landing stabilization system can comprise a funnel sized to receive a landing rocket and a stabilization structure positioned above the funnel. The stabilization structure can include a first lateral support cable, a second lateral support cable spaced apart from the first lateral support cable, a first stabilization cable coupled to the first lateral support cable and coupled to the second lateral support cable, and a second stabilization cable coupled to the first lateral support cable and coupled to the second lateral support cable. The first stabilization cable can be adjustable with respect to the second stabilization cable along the first lateral support cable and along the second lateral support cable. The first lateral support cable can be coupled to a first upright support structure and the second lateral support cable can be coupled to a second upright support structure. The first and second upright support structures can be columns or walls.

The stabilization structure can further include a third lateral support cable positioned below the first lateral support cable, a fourth lateral support cable positioned below the second lateral support cable and spaced apart from the third lateral support cable, a third stabilization cable positioned below the first stabilization cable and coupled to the third lateral support cable and coupled to the fourth lateral support cable, and a fourth stabilization cable positioned below the second stabilization cable and coupled to the third lateral support cable and coupled to the fourth lateral support cable.

A rocket landing stabilization system can further comprise a hook coupled to a rocket, the hook configured to engage the stabilization structure. The stabilization structure can include a clamp system. The clamp system can include a plurality of jaws. A rocket landing stabilization system can further comprise a body of water under the stabilization structure. The funnel can float on the body of water. The funnel can be coupled to at least one propeller to enable the funnel to be repositioned by the propeller.

A method of stabilizing a landing rocket can comprise landing the rocket on a funnel and actuating a stabilization structure positioned above the funnel. Actuating the stabilization structure can include moving a first stabilizing cable toward a second stabilizing cable until the rocket is held between the first and second stabilizing cables. The method can further comprise engaging a hook coupled to the rocket with the stabilization structure. Actuating the stabilization structure can include clamping the rocket between a plurality of jaws. The stabilization structure can be positioned above a body of water. The funnel can be floating on the body of water. The method can further comprise using a propeller coupled to the funnel to move the funnel through the body of water.

DETAILED DESCRIPTION

Figure 1:
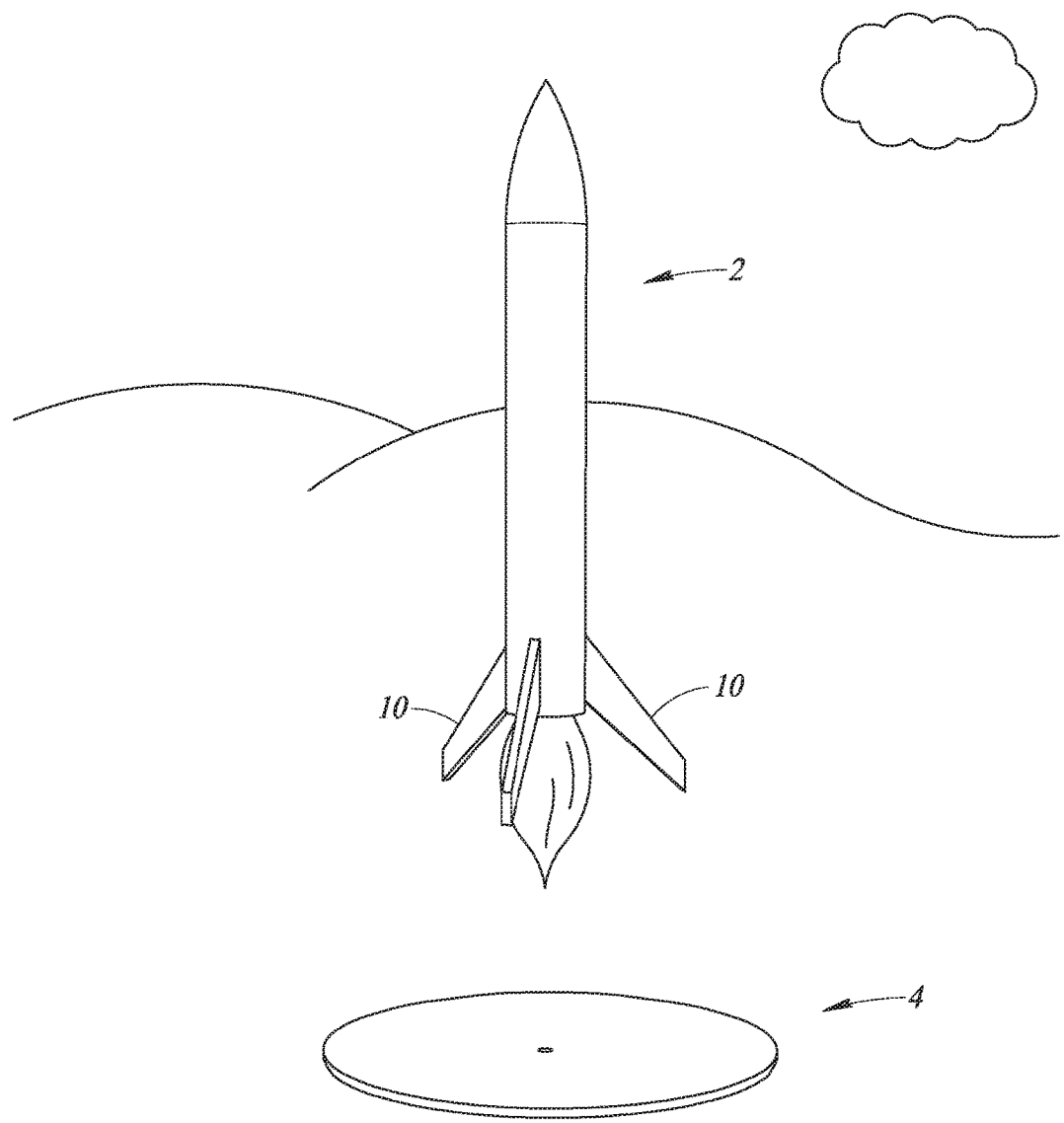
FIG. 1 illustrates a rocket landing at a land-based landing site.
Figure 2:
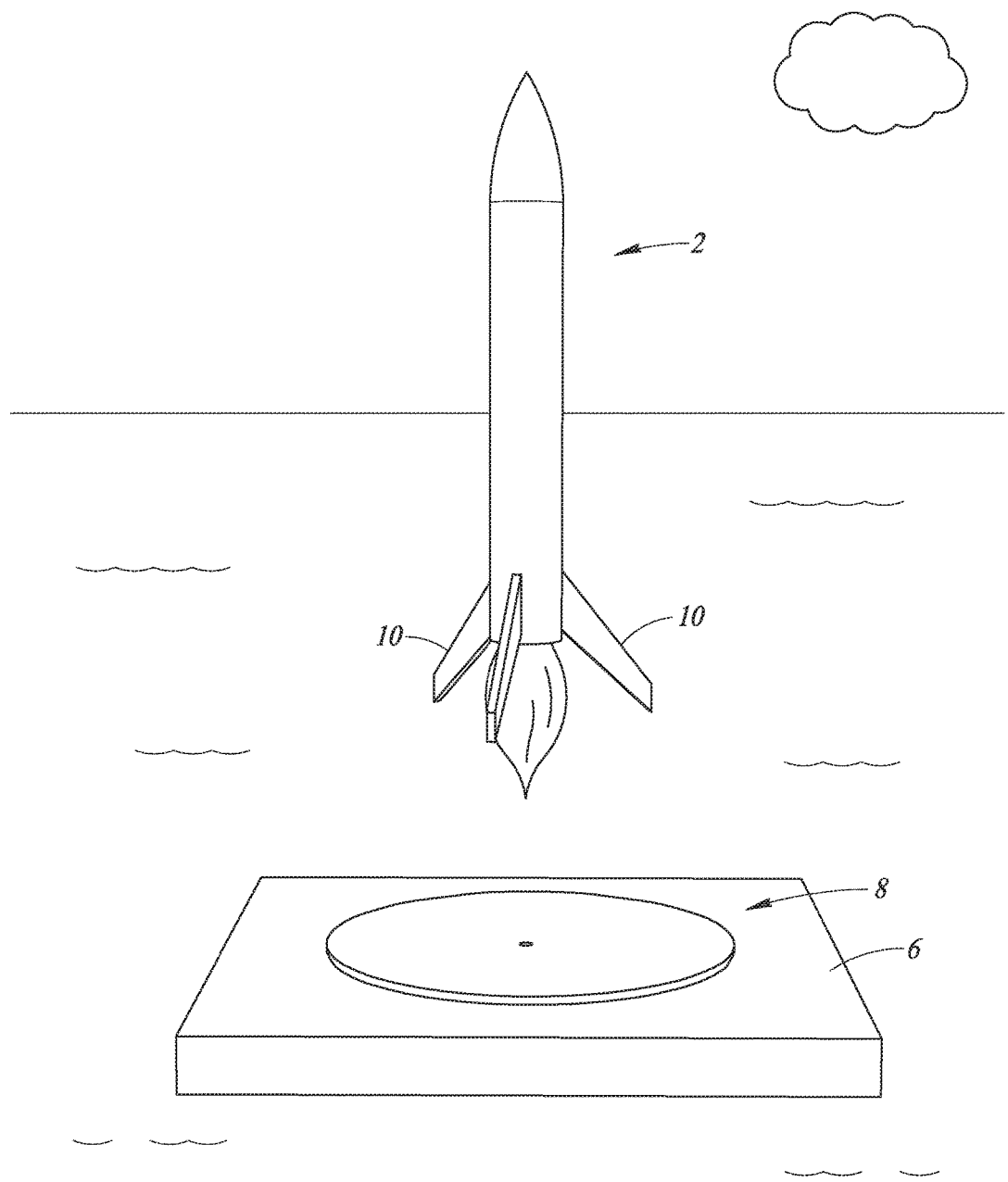
FIG. 2 illustrates a rocket landing at a sea-based landing site.

FIG. 1 illustrates a rocket 2 landing on the ground at a land-based landing site 4. FIG. 2 illustrates the rocket 2 landing on a barge 6 in the ocean at a sea-based landing site 8. In both a land-based and a sea-based landing, the rocket 2 includes landing gear 10 that can help the rocket 2 come to rest at the landing site. Because of the relatively small width to height ratio of the landing gear 10 relative to the overall height of the rocket 2, and because the center of mass of the rocket 2 can be higher than desired when the rocket 2 is attempting to land at a landing site, the rocket 2 can be prone to tip over, causing damage to or destruction of the rocket 2.

Figure 3:
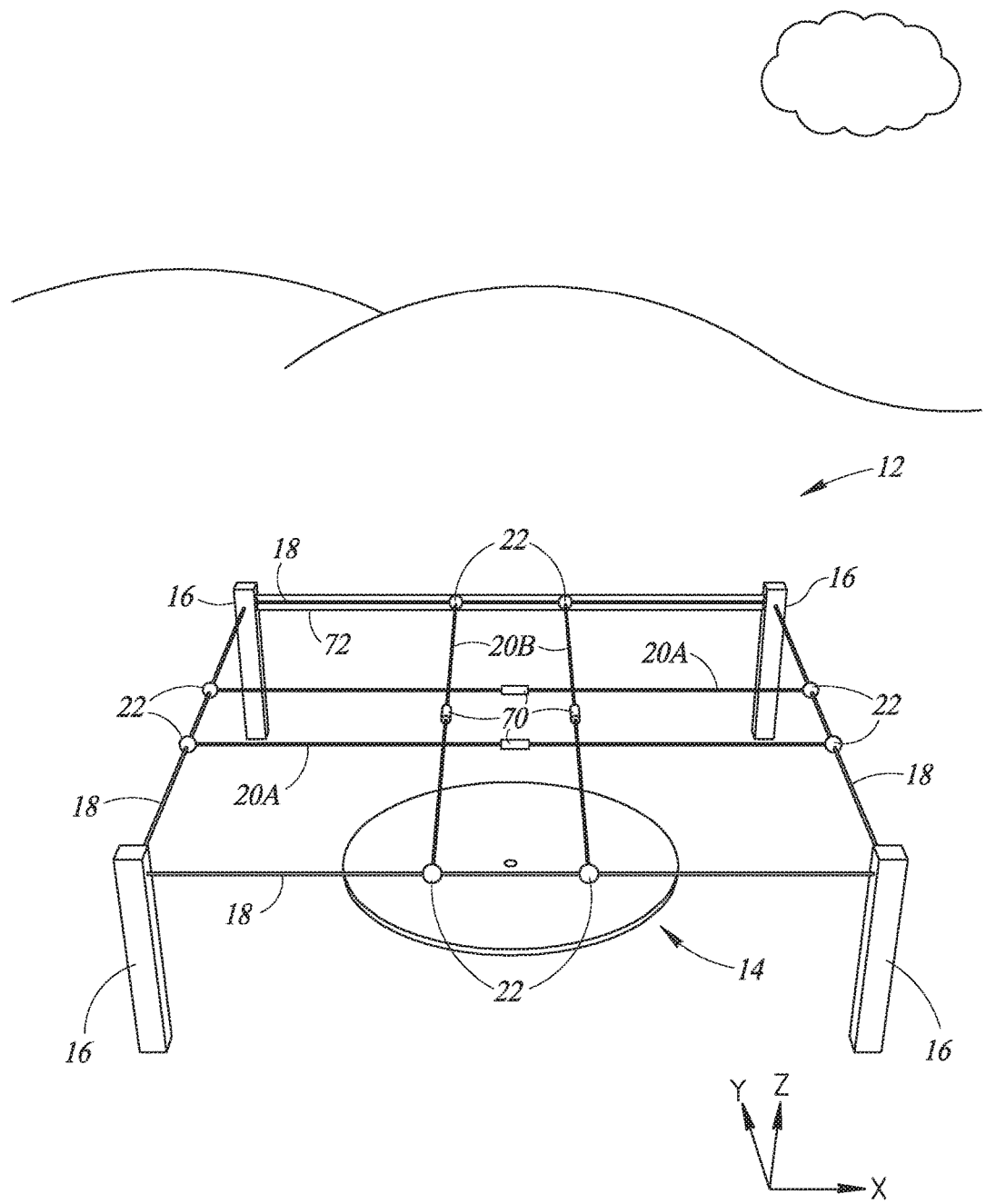
FIG. 3 illustrates a first rocket landing stabilization system.

Therefore, as shown in FIG. 3, a rocket stabilizing structure 12 can be used to stabilize the rocket 2 as it attempts to land at a landing site 14. While landing site 14 is illustrated as a land-based landing site 14, landing site 14 can in alternative embodiments be a sea-based landing site 14. The stabilizing structure 12 includes four upright support structures 16 (e.g., vertical posts or columns) extending vertically relative to the ground. The upright support structures 16 can be spaced apart from one another so as to form the four corners of a square or rectangular configuration with the landing site 14 at its center. The upright support structures 16 can be rigid columns made of steel, reinforced concrete, or any other suitable materials. In one alternative embodiment, the landing site 14 is enclosed by support elements, such as by being located below ground level or within a surrounding structure such as a solid cast in place concrete wall in place of the upright support structures 16. Such a surrounding structure can include support elements similar to those described below in the form of rails embedded inside protective voids within the surrounding structure.

The stabilizing structure 12 also includes a set of four lateral support elements 18, each of the lateral support elements extending between two of the upright support structures 16 so that the support elements 18 form the four sides of the square or rectangular configuration with the landing site 14 at its center. The lateral support elements 18 can be rigid beams or girders made of steel or other suitable materials, or can be relatively flexible cables or wires made of steel or other suitable materials. The upright support structures 16 and the lateral support elements 18 can collectively be referred to as a gantry arrangement or a gantry system.

The stabilizing structure 12 also includes a plurality of stabilizing elements 20A, 20B (collectively 20), including a first pair of stabilizing elements 20A oriented along a first axis X and spanning between two opposed lateral support elements 18, and a second pair of stabilizing elements 20B oriented along a second axis Y perpendicular to the first axis X and spanning between the other two opposed lateral support elements 18. The stabilizing elements 20 can be rigid beams or girders made of steel or other suitable materials, or can be relatively flexible cables, straps, wires, or some combination thereof made of steel or other suitable materials.

Each end of each of the stabilizing elements 20 can be coupled to one of the support elements 18 by a coupling element 22. The coupling elements 22 can include mechanical features that couple the ends of the stabilizing elements 20 to the support elements 18 so that the ends of the stabilizing elements 20 can be moved independently of each other longitudinally along the length of the support elements 18 in a controlled manner. For example, the stabilizing elements 20 can be moved at high speed along the support elements 18 using high speed belts on encoded motor driven pulleys. A center portion of each of the stabilizing elements 20 can be coupled or tied to a first end of a respective resistive cable (not illustrated). A second end of each resistive cable opposite to its first end can be coupled to a spring or other resistive apparatus to resist longitudinal motion of the resistive cable. The resistive cables can increase tension in the stabilizing elements 20 to prevent the stabilizing elements from swaying as they move or impacting a landing rocket at undesirably high speeds. The coupling elements 22 can include weak points in the structure 12 such that any extreme loading events occurring within the stabilizing elements 20 result in breaking away or decoupling of the coupling elements 22 and separation of the stabilizing elements 20 from the lateral support elements 18 such that extreme loads are not transferred to the gantry arrangement or gantry system.

The coupling elements 22 can include mechanical features that can let out or take in the stabilizing elements 20 to provide slack or tension to the stabilizing elements 20. Additionally, the stabilizing elements 20 can include engagement fittings 70 to engage the rocket 2 in a more form-fitting manner. In embodiments including such engagement fittings 70, the stabilizing elements 20 can be moved along the support elements 18 to adjust the location of the engagement fittings 70 to a suitable location to embrace the rocket 2. In some implementations, the engagement fittings 70 can move along the length of the respective stabilizing elements 20. The coupling elements 22 can include encoded motors to move the stabilizing elements 20 along the support elements 18. Additionally, the coupling elements 22 can include mechanical features that can slow or brake their movement along the support elements 18 in anticipation of encountering the load of the rocket 2, in order to prevent excessive stresses being imparted to the high-speed belts or encoded motor driven pulleys.

A method of landing a rocket such as rocket 2 at the landing site 14 can include launching the rocket 2, such as from a land-based or a sea-based launching site. The method can further include controlling the rocket 2 such that it follows a controlled launch trajectory, such as into outer space. The method can further include performing various maneuvers with the rocket 2, such as to deliver a payload to a desired location, and to change the orientation of the rocket 2 such that it begins to fall back toward the earth in an orientation in which its engine faces the earth. The method can further include controlling the rocket 2 such that it follows a controlled descent trajectory, such as toward the landing site 14.

The method can further include actuating the stabilizing elements 20A to move apart from one another along the lateral support elements 18 and actuating the stabilizing elements 20B to move apart from one another along the lateral support elements 18, such as to bring both sets of stabilizing elements 20 to protective enclosures such as protective enclosure 72 residing on the support elements 18 (only one is shown in FIG. 3, but one can be provided on each of the support elements 18). The method can further include controlling the rocket 2 such that it begins a landing sequence at the landing site 14, similar to that shown in FIG. 1, such that the rocket 2 is positioned between the stabilizing elements 20A and between the stabilizing elements 20B.

The method can further include actuating the stabilizing elements 20A to move toward each other and actuating the stabilizing elements 20B to move toward each other, thereby enclosing the rocket 2 within the stabilizing elements 20. The method can further include landing the rocket 2 at the landing site 14, such as on the landing gear 10 under the control of the rocket engine. The stabilizing elements 20 can contact the rocket 2 to stabilize the rocket 2 and prevent it from tipping over or damaging the landing gear during the landing, thereby preventing its destruction or deterioration. In some cases, the stabilizing elements 20 do not contact the rocket 2, such as if the rocket 2 successfully lands on the landing gear 10.

The stabilizing elements 20 can be moved at high speed, e.g., after the threat of the rocket's flame has passed below the stabilizing elements 20, to within close proximity of, or into contact with, the rocket 2. The rocket stabilizing structure 12 can include sensors that can detect or track the location of the rocket 2, and the sensors can be used to determine X and Y coordinates of the expected landing location of the rocket 2. These coordinates can be used to direct the movement of the stabilizing elements 20 such that the stabilizing elements 20 close in on the rocket 2 without pushing it laterally.

The sensors can also trigger the closing of the stabilizing elements 20 when the rocket 2 reaches an elevation at which a portion of the rocket 2 is between the stabilizing elements 20. In some cases, the closing of the stabilizing elements 20 can be coordinated with the descent of the rocket 2 such that as the rocket 2 approaches the landing site 14, and hovers over the landing site 14 or descends relatively slowly toward the landing site 14, the stabilizing elements 20 continuously close in on the rocket 2. In some cases, tension in the stabilizing elements 20 can increase as the rocket 2 approaches the landing site 14 and hovers over the landing site 14 or descends relatively slowly toward the landing site 14. This can help to prevent heat generated by the rocket 2 from damaging the stabilizing structure 12 and the stabilizing elements 20.

Figure 4:
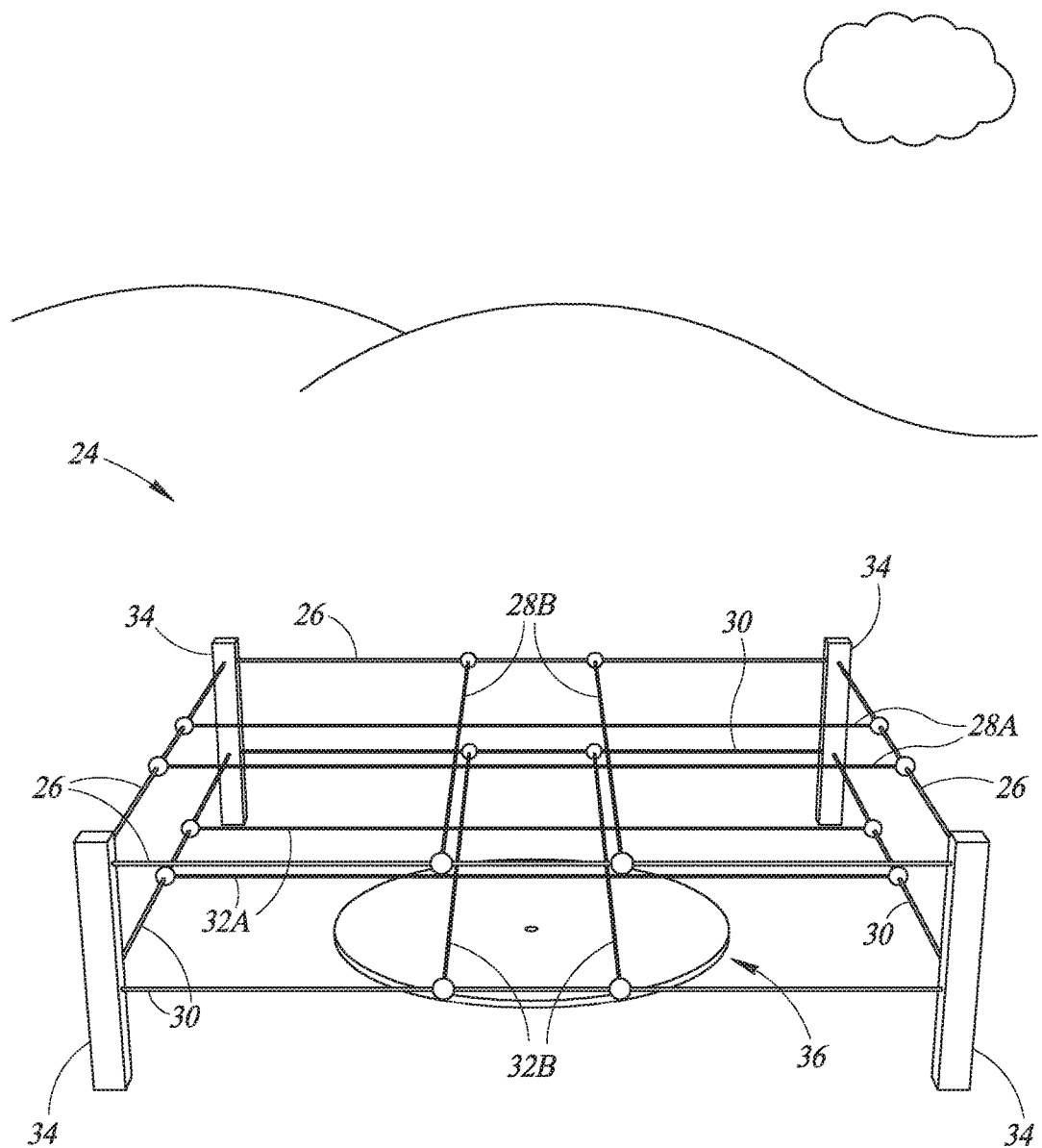
FIG. 4 illustrates a second rocket landing stabilization system.

FIG. 4 illustrates a stabilization system 24 similar to stabilizing structure 12, but having a first set of support elements 26 and stabilizing elements 28A, 28B (collectively 28) and a second set of support elements 30 and stabilizing elements 32A, 32B (collectively 32). Both sets of support elements 26, 30 can be coupled to and supported by a set of four upright support structures 34 (e.g., post, columns). The first set of support elements 26 and stabilizing elements 28 can be similar to the support elements 18 and stabilizing elements 20 and the second set of support elements 30 and stabilizing elements 32 can be similar to the support elements 18 and stabilizing elements 20.

A method of using the stabilizing system 24 can be similar to the method described above. The method can include actuating each of the stabilizing elements 28A, 28B, 32A, and 32B to move apart from one another along the respective support elements 26, 30. The method can further include controlling the rocket 2 such that it begins a landing sequence at the landing site 36 such that the rocket 2 is positioned between the stabilizing elements 28A, between the stabilizing elements 28B, between the stabilizing elements 32A, and between the stabilizing elements 32B. The method can further include actuating the stabilizing elements 28A, 28B, 32A, and 32B to move toward each other so that they enclose and stabilize the rocket 2. The stabilizing elements 28, 32 can provide two separate stabilization locations, spaced apart from one another along a vertical Z axis perpendicular to the X and Y axes, at which the rocket 2 can contact and thereby stabilize the rocket 2. In some cases the rocket 2 can land without contacting the stabilizing elements 28, 32, such as when the rocket 2 successfully lands on the landing gear 10. The stabilizing elements 28, 32 can act independently of one another, such as to allow the upper set to activate first as the rocket descends below the upper set, clearing a safety plane of the upper set, and the lower set to activate second as the rocket descends below the lower set, clearing a safety plane of the lower set.

Figure 5:
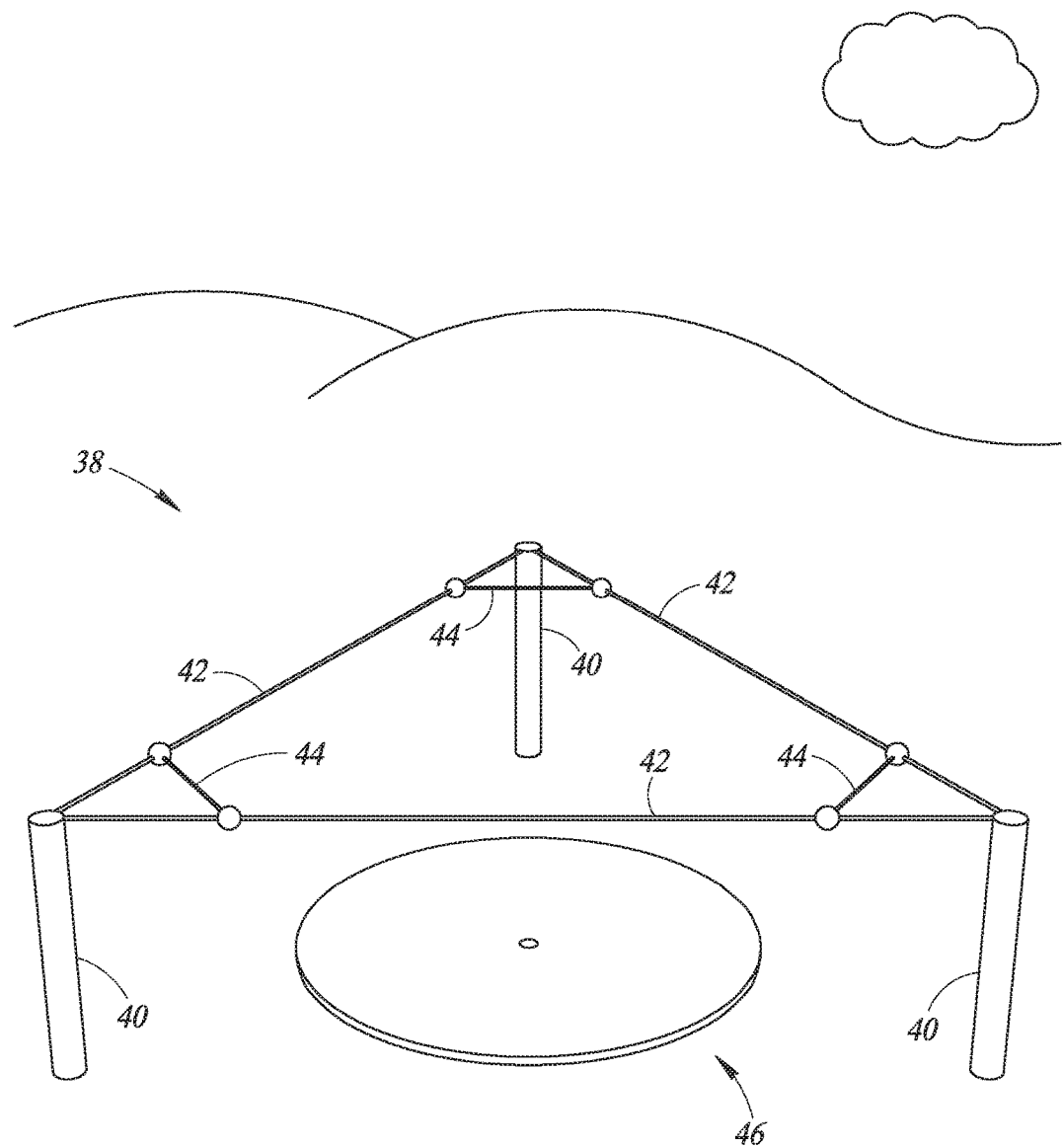
FIG. 5 illustrates a third rocket landing stabilization system.

FIG. 5 illustrates a stabilization system 38 similar to stabilizing structure 12, but having three upright support structures 40, three lateral support elements 42, and three stabilizing elements 44. The stabilizing elements 44 can be elastic or have adjustable lengths so that as they move along the support elements 40 their length can change to match the changing distance between the support elements 42. A method of using the stabilizing system 38 can be similar to the methods described above, including actuating the stabilizing elements 44 to move away from one another, positioning the rocket 2 between the stabilizing elements 44, closing the stabilizing elements 44 around the body of the rocket 2, and then landing the rocket 2 at the landing site 46.

The stabilizing elements described herein can be straps, wires, cables, or some combination thereof, made of fabric or polymers, and the systems described herein can be referred to as high speed cable strap arrest systems, which can be actuated to move as described herein using electro-magnetically-powered actuators. Any of the systems described herein can be used to land a rocket 2 at a land-based landing site or at a sea-based landing site, such as on a barge or rocket landing platform in the ocean. In some cases, the stabilizing elements described herein can be positioned at about half the height of the rocket 2, or at a location above the center of gravity of the rocket 2. In some cases, a first set of stabilizing elements can be positioned at about one quarter the height of the rocket 2 and a second set of stabilizing elements can be positioned at about three quarters the height of the rocket 2. In some cases, a first set of stabilizing elements can be positioned at about one third the height of the rocket 2 and a second set of stabilizing elements can be positioned at about two thirds the height of the rocket 2.

Figure 6:
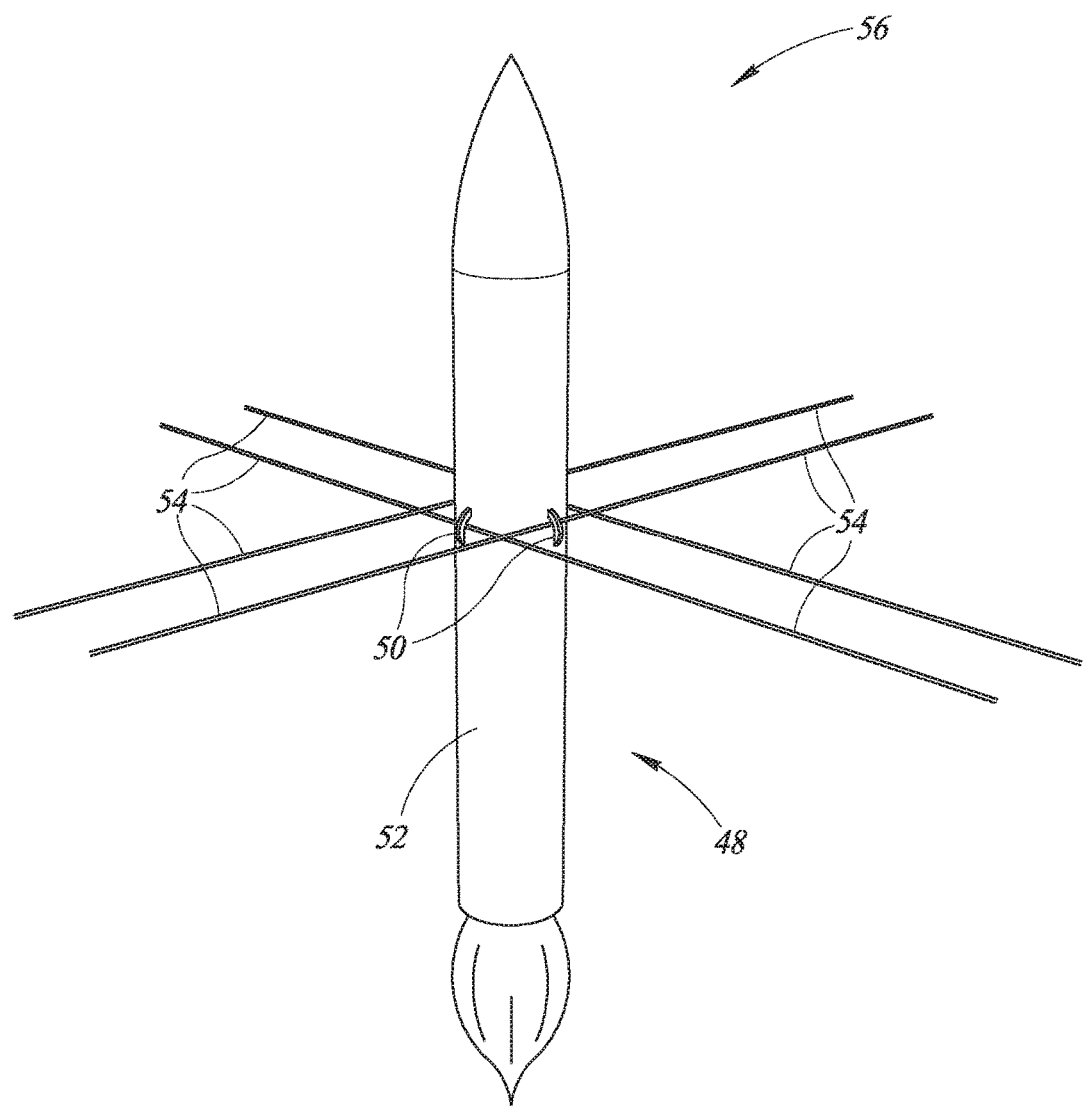
FIG. 6 illustrates a fourth rocket landing stabilization system.

As described above, the rocket 2 can be stabilized by a stabilization system as the rocket 2 lands at a landing site on landing gear 10. As shown in FIG. 6, a rocket 48 can include hooks or fins 50 extending laterally away from its main body 52. For example, such fins 50 can be used to guide the descent trajectory of the rocket 48. These hooks or fins 50 can be caught on stabilization elements 54 of a stabilization structure 56, such that the rocket 48 does not actually directly contact its landing site, but is instead caught or cradled, by the stabilization elements 54. Such embodiments can eliminate the need for the landing gear altogether such that the rocket 48 can have no landing gear, thereby reducing the weight and complexity of the rocket 48.

In such embodiments, the stabilization elements 54 can have sufficient strength to catch and hold the rocket 48. In some cases, coupling elements (e.g., coupling elements 22) can be provided with a clutch system to feed out additional length of the stabilization elements 54 and to retract excess length of the stabilization elements 54 as needed, to further cradle the rocket 48 and provide a soft controlled landing. In embodiments in which a stabilization structure 56 is designed to catch the rocket 48, the rocket 48 can be provided with landing gear as a back-up or safety feature.

Figure 7:
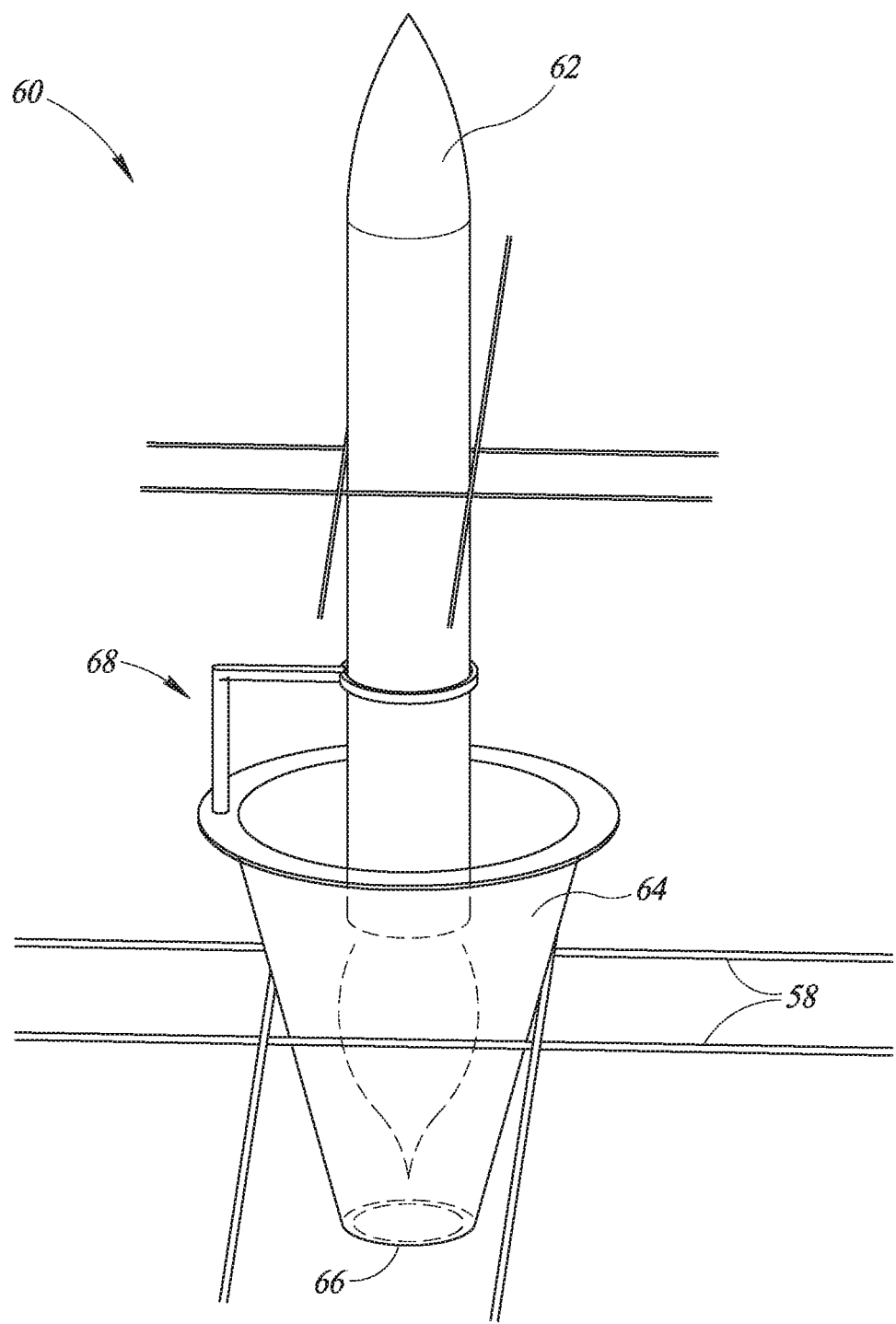
FIG. 7 illustrates a fifth rocket landing stabilization system.

As shown in FIG. 7, a rocket stabilizing system 60 can include an additional set of support elements (not illustrated) and an additional set of stabilizing elements 58 positioned close to the landing site vertically. A rocket 62 can in some cases come to rest on this additional set of stabilizing elements 58, which can help the rocket 62 to self-center. For example, the additional set of stabilizing elements 58 can support a large funnel or hollow tapered body 64 having a flange or open ring 66 positioned at a relatively small, bottom opening thereof, and the rocket 62 can come to rest on the flange 66 of the funnel 64 while exhaust from the rocket 62 can flow through the funnel 64. The stabilizing elements 58 can be actuated to move the funnel 64 along the x-, y-, or z-axes. For example, the rocket stabilizing system 60 can include a clutch that can be actuated to allow the funnel 64 to be moved along the z-axis.

In some cases, the rocket 62 can descend into the funnel 64, and can be guided downward by the funnel 64 until it comes to rest therein. The funnel 64 can have a height of several meters or even up to the length of the rocket 62, such that the rocket 62 can be completely enclosed and cradled within the funnel 64. The rocket 62 can be provided with roller bearings or chamfered surfaces of a relatively lubricious material at its bottom end so as to smoothly and safely engage with the funnel 64 as it lands. The additional set of support elements, additional set of stabilizing elements 58, or the funnel 64 can be vertically adjustable along the Z axis to further cushion the rocket 62 as it lands. For example, the funnel 64 can be moved in the Z axis at a rate that is a constant percentage of the Z axis velocity of the rocket 62.

Figure 8:
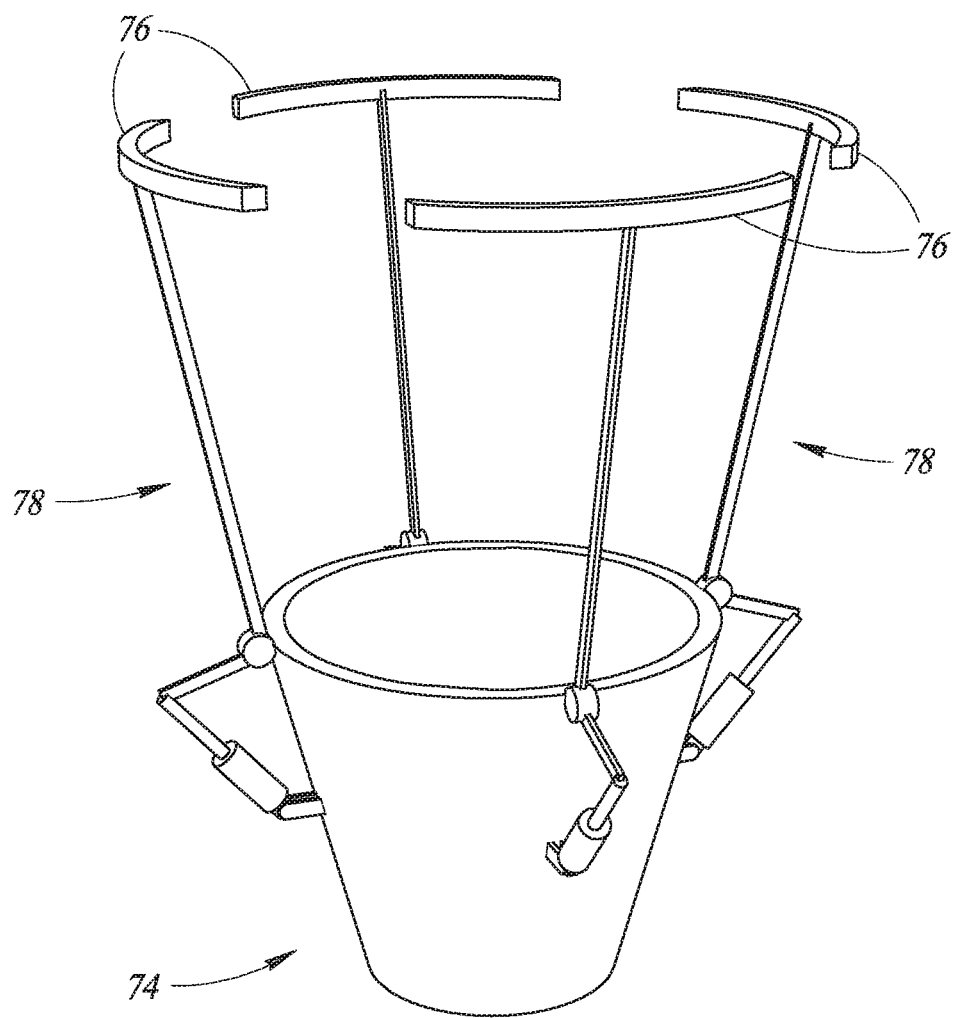
FIG. 8 illustrates components of a sixth rocket landing stabilization system.

In some cases, the funnel 64 or the flange 66 can have a first mating surface and the rocket 62 can have a second mating surface complementary to the first mating surface so that the funnel 64 or flange 66 can mate with the rocket 62 when the rocket 62 lands at the landing site. In some cases, the funnel 64 can include one, two, three, or more jaw features 68, such as mounted to a flange at the top of the funnel 64, that can be used to enclose and grasp the rocket 62 as it comes to rest in or on the funnel 64. FIG. 8 shows an alternative funnel 74 that includes four alternative jaw features 76 that can be actuated to move toward one another, as illustrated by the arrows 78, to enclose and grip or grasp the rocket 62 to stabilize the rocket 62 as it lands. The jaw features 68 and 76 can be referred to herein as stabilizing structures.

This additional set of support elements and stabilizing elements 58 can be formed from very high-strength and heavy cables. The sensors described above can be used to track the location of the rocket 62 as it descends toward the landing site and this information can be used to adjust the location of the additional set of stabilizing elements 58 to match the location of the rocket 62 as the rocket 62 descends. In some cases, this tracking can be achieved using triangulation of data from corners of the stabilization structure 60 to determine an accurate location, and data regarding orientation of the rocket 62 can be provided by accelerometers onboard the rocket 62. These features can reduce or eliminate the need for landing gear and the rocket 62 can have no landing gear in some cases.

In some embodiments, the support elements described herein, such as the lateral support elements 18, 26, 30, or 42, can be vertically adjustable in the Z axis along the respective upright support structures 16, 34, 40. In some embodiments, a body of water and a water distribution system incorporated within the stabilizing elements, the engagement fittings, or the large funnel type structure can be provided to cool components of the rocket 2 or the stabilizing system at the landing site, to prevent damage from excessive heat.

Figure 9:
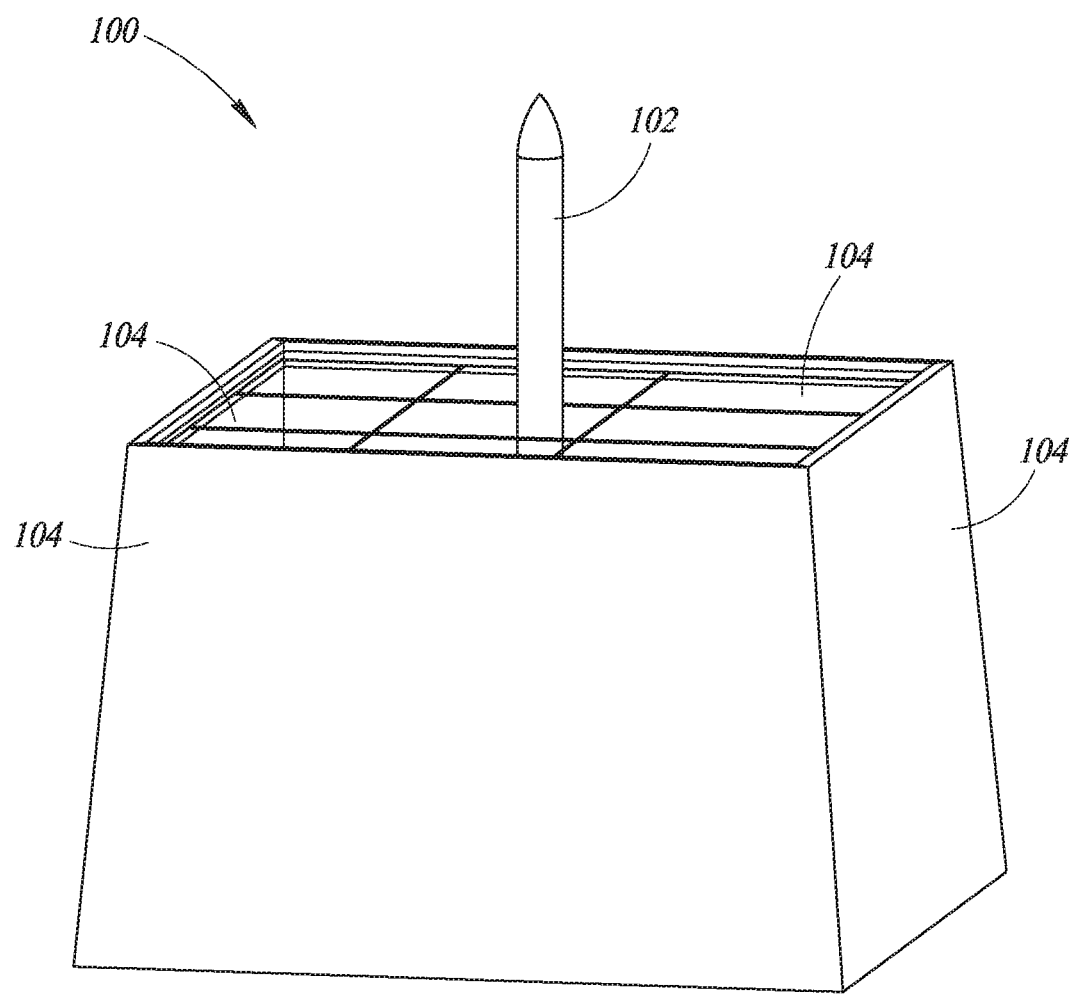
FIG. 9 illustrates a seventh rocket landing stabilization system.

FIG. 9 illustrates a rocket landing stabilization system 100, which can be used to stabilize a rocket 102 as it lands within the stabilization system 100. The stabilization system 100 can include four upright support structures, such as four peripheral walls 104. The peripheral walls 104 can comprise reinforced pre-cast concrete, iron, steel, or other suitable materials. In some implementations, the stabilization system 100 can be located on land with the peripheral walls 104 supported on a foundation structure. In other implementations, the stabilization system 100 can be located at sea, and can be configured to float in water. For example, the stabilization system 100 can include a closed bottom end spanning between the four peripheral walls 104 so that the stabilization system 100 forms a large floating barge. As another example, the stabilization system 100 can include an open bottom so that an internal space of the stabilization system 100 is open to the sea on which it floats, and the peripheral walls 104 can be hollow or coupled to separate floatation devices so that the stabilization system 100 forms a large floating barge.

Figure 10:
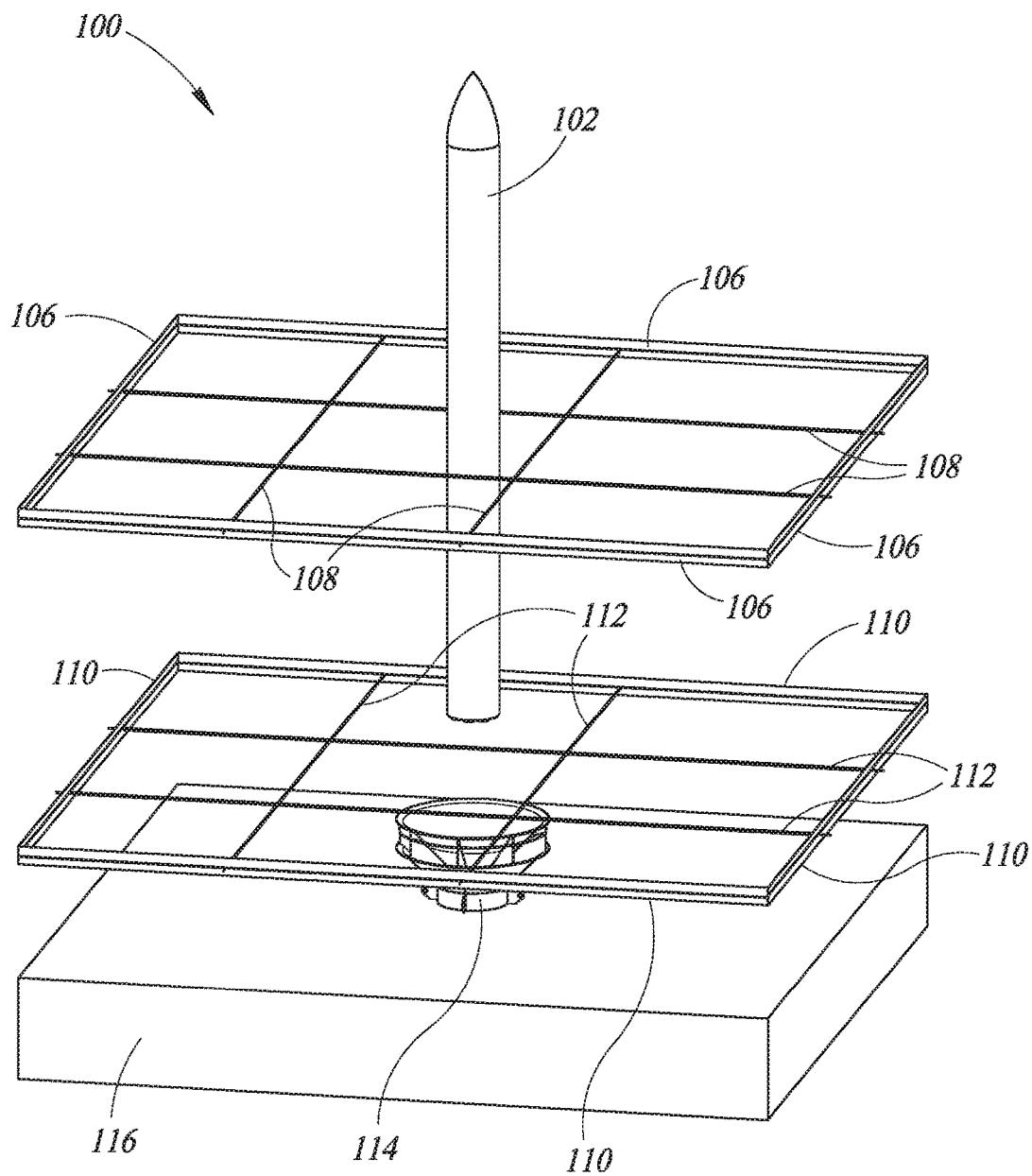
FIG. 10 illustrates the rocket landing stabilization system of FIG. 9 with peripheral walls removed.

FIG. 10 illustrates the stabilization system 100 with the peripheral walls 104 removed so that internal components of the stabilization system 100 are more clearly illustrated. As illustrated in FIG. 10, the stabilization system 100 includes a first set of support elements 106 and a first set of stabilizing elements 108, as well as a second set of support elements 110 and a second set of stabilizing elements 112. These support elements 106, 110 and stabilizing elements 108, 112 can include the same features and function in the same or similar ways as described elsewhere herein, such as with respect to similar components illustrated in FIG. 4. Coupling elements similar to the coupling elements 22 described above can couple the stabilizing elements 108, 112 to the respective support elements 106, 110, and can include actuators to actuate motion of the stabilizing elements 108, 112, ratcheting brake systems to absorb loads resulting slowing motion of the stabilizing elements 108, 112, rack systems to prevent such loads from being transferred to the actuators, and clutch systems to reduce tension in the stabilizing elements 108, 112. In some implementations, the second set of support elements 110 and second set of stabilizing element 112 can be omitted or replaced by a clamp system similar to the jaw features 68 or 76 described with respect to FIGS. 7 and 8. In some implementations, the first and second sets of support elements 106, 110, can be at least partially embedded or enclosed within the peripheral walls 104 to protect the support elements 106, 110 as the rocket 102 lands.

FIG. 10 also illustrates that the stabilization system 100 can include a body of liquid, such as a body of water 116 that spans between the bottom portions of the peripheral walls 104. In implementations in which the stabilization system 100 is located on land, the body of water 116 can comprise an artificial pond formed within the stabilization system 100. In implementations in which the stabilization system 100 is located at sea and includes a closed bottom end, the body of water 116 can comprise water from any source. For example, the body of water 116 can include salt water pumped into the stabilization system 100 from the surrounding body of water on which the stabilization system 100 floats. As another example, the body of water 116 can include freshwater pumped into the stabilization system 100 prior to the stabilization system leaving port. In some cases freshwater is preferred to salt water because freshwater results in reduced corrosion. In implementations in which the stabilization system 100 is located at sea and includes an open bottom end, the body of water 116 can comprise water that enters the stabilization system 100 from the surrounding body of water on which the stabilization system 100 floats.

Figure 11:
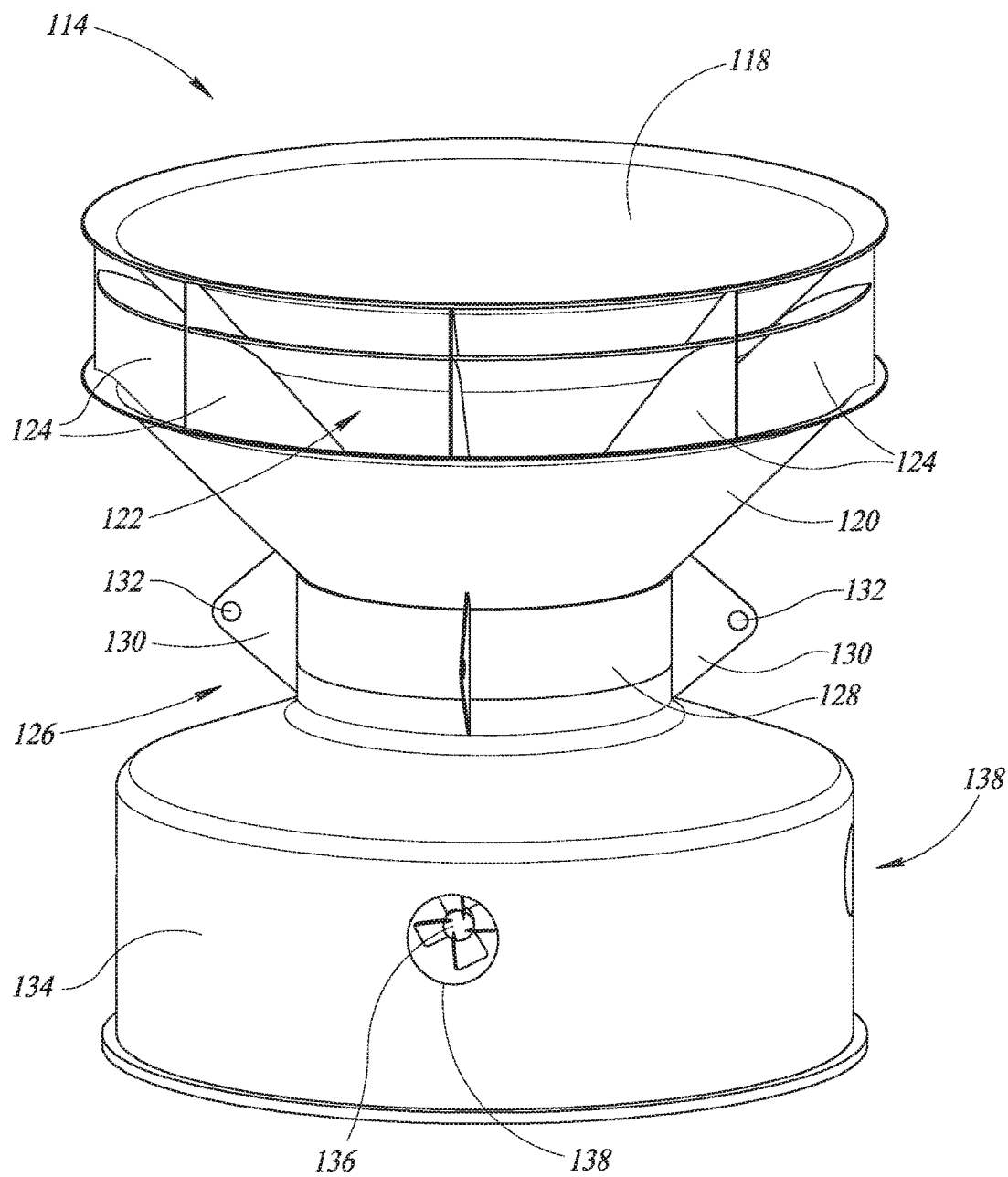
FIG. 11 illustrates a cradle component of the rocket landing stabilization system of FIGS. 9-10.
Figure 12:
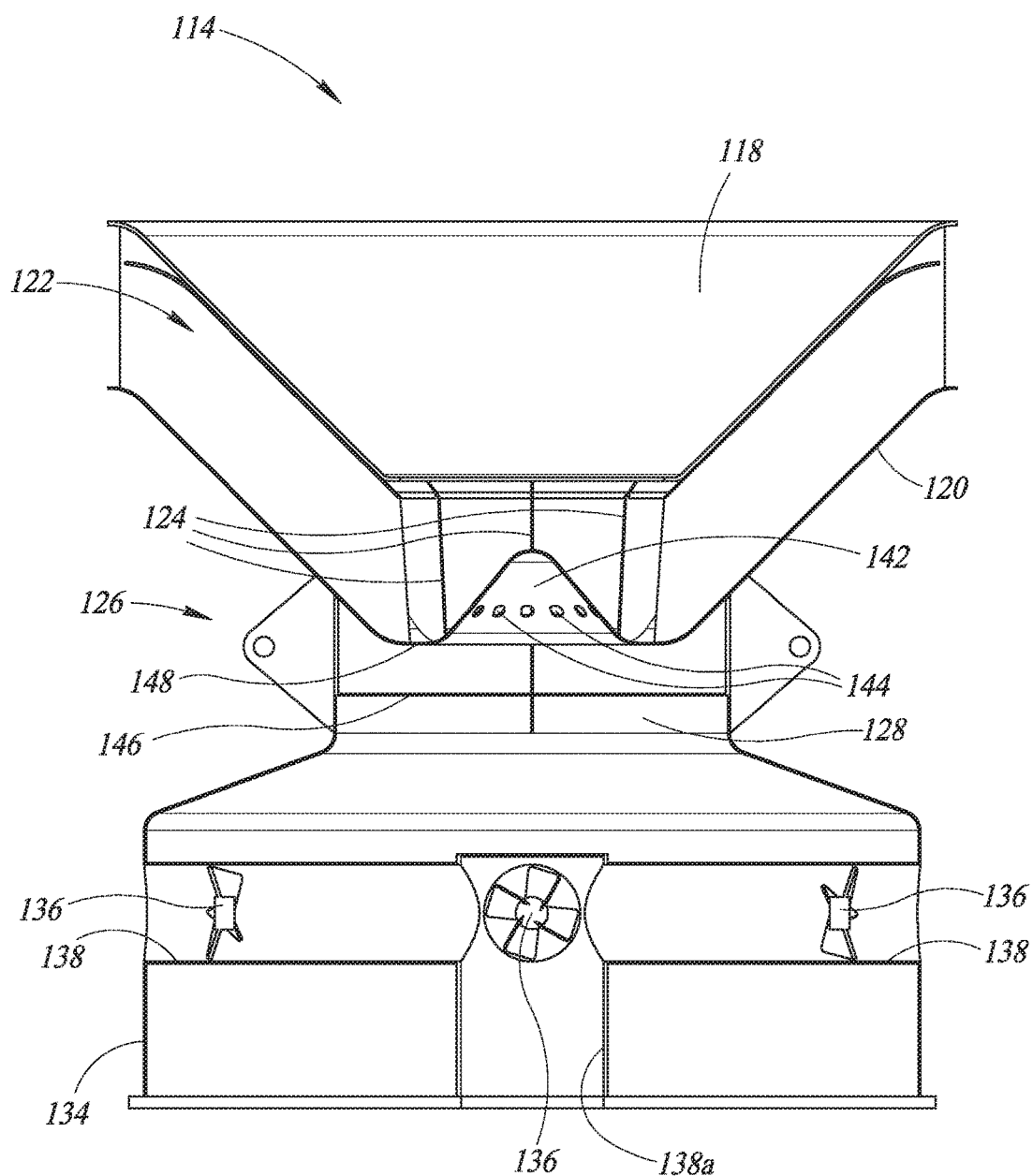
FIG. 12 illustrates a cross-sectional view of the cradle component of FIG. 11.
Figure 13:
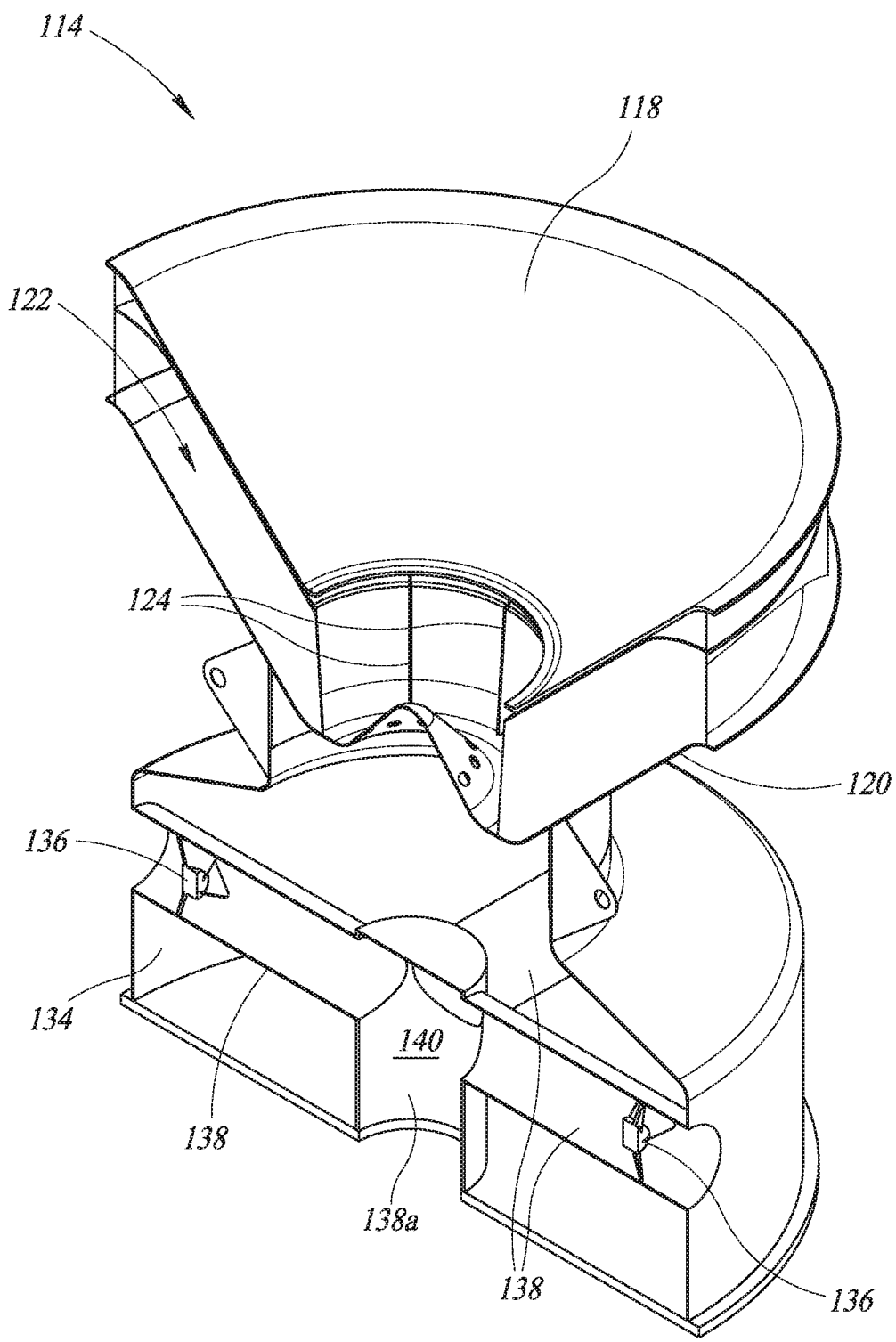
FIG. 13 illustrates an oblique cross-sectional view of the cradle component of FIGS. 11-12.

FIG. 10 also illustrates that the stabilization system 100 can include a cradle 114 that can float within the body of water 116. FIGS. 11 through 13 illustrate the cradle 114 in greater detail. As illustrated in FIG. 11, the cradle 114 can include a top funnel or inverted cone 118, which can function in ways similar to those described above with respect to funnels 64 and 74 illustrated in FIGS. 7 and 8. The top funnel 118 can comprise a two-inch thick steel plate, while other components of the cradle 114 can comprise one-inch thick steel plate material. The cradle 114 can include a second funnel 120 having either the same or different dimensions as the top funnel 118 located below and separated from the top funnel 118 by a predetermined distance, to form a conically-shaped exhaust passage 122 between the top funnel 118 and the second funnel 120. A plurality of supporting plates 124 can be coupled at respective first ends to the top funnel 118 and at respective second ends opposite the first ends to the second funnel 120, such that the supporting plates 124 extend vertically between the two funnels 118, 120, to maintain the predetermined distance and form the exhaust passage 122.

The funnels 118 and 120 can converge as they extend downward and the second funnel 120 can be coupled at its bottom end to a neck portion 126 of the cradle 114. The neck portion 126 can include a vertically oriented cylindrical body 128 having a large diameter (e.g., sixteen foot diameter) and a plurality of coupling plates 130 extending radially outward from the cylindrical body 128. Two coupling plates 130 are visible in FIG. 11, but four coupling plates 130, spaced at right angles from one another around the neck portion 126, can be used. The coupling plates 130 can include respective openings 132 to which cables, straps, or wires can be coupled to pull the cradle 114 around horizontally (e.g., along x- and y-axes) within the body of water 116. The coupling plates 130 can be coupled to the cradle 114 at a vertical location corresponding to a center of balance of the cradle 114, such that pulling the cradle 114 using the coupling plates 130 does not pull the cradle 114 over. In some implementations, the cradle 114 can include two sets of coupling plates 130 spaced apart from one another vertically, such as a first set of coupling plates 130 at the neck portion 126 and a second set of coupling plates 130 at the bottom of the cradle 114, so as to allow two independent sets of cables, straps, or wires coupled to the respective coupling plates 130 to keep the cradle 114 vertical or plumb in the body of water 116.

The neck portion 126 can be coupled at its bottom end to a vertically-extending cylindrical bottom tank 134. The bottom tank 134 can house a plurality of internal conduits 138 and propellers 136, which can be used to move the cradle 114 around horizontally (e.g., along x- and y-axes) within the body of water 116. The propellers 136 can allow the cradle 114 to move around within the body of water 116 autonomously, or under the guidance of an on-board computer control system, such as in response to information received regarding the location and trajectory of the rocket 102 as it is landing on the cradle 114.

FIG. 12 illustrates the cradle 114 in cross-section, and FIG. 13 illustrates the cradle 114 in cross-section from an oblique angle, to provide additional views of some of the components of the cradle 114. For example, FIGS. 12 and 13 illustrate more clearly that the bottom tank 134 houses a system of internal conduits that includes a vertical conduit 138a extending upward from an inlet at a center of the bottom end of the bottom tank 134 to a junction 140 of the system of internal conduits. The system of internal conduits also includes four horizontal conduits 138, each extending radially outward from the junction 140 to outlets at a radial periphery of the bottom tank 134. The four horizontal conduits 138 can each extend outward from the junction 140 along axes at right angles to one another, and can each house a respective impeller or propeller 136. To move the cradle 114 around within the body of water 116, the propellers 136 can be actuated to drive a flow of water through the conduits 138, 138a.

FIGS. 12 and 13 also illustrate more clearly that, as the rocket 102 lands within the top funnel 118, its exhaust can travel out of the top funnel 118 through an opening at its bottom end, radially outward between the plates 124, and upward and outward through the exhaust passage 122 between the funnels 118 and 120. FIGS. 12 and 13 also illustrate that an upwardly pointing cone 142 can be positioned at the center of the funnels 118 and 120 and between the plates 124. The cone 142 can include a plurality of openings 144 through which water can be sprayed (e.g., using internal pumps and piping to pump water from the body of water 116) to cool the exhaust from the rocket 102 as the rocket 102 lands on the cradle 114 and the exhaust passes through the exhaust passage 122.

As the cradle 114 floats within the body of water 116 without the rocket 102 situated on the cradle 114, the bottom tank 134 can be positioned underwater and can be filled with air to provide buoyancy to the rest of the cradle 114. The funnels 118 and 120 can be positioned above the water to allow the rocket 102 to land, and a first water line 146 can extend around the neck portion 126, as shown in FIG. 12. As the rocket 102 lands on the cradle 114, the weight and other forces exerted by the rocket 102 can force the cradle 114 to sit deeper in the body of water 116, such that a second water line 148 extends around a higher point of the neck portion 126, as shown in FIG. 12. The second water line 148 can be generally level with the bottom end of the second funnel 120 and can be, in some instances, about four feet above the first water line 146. Because the cradle 114 floats within the body of water 116, it can move up and down in the water to cushion the rocket 102 as it lands on the cradle 114. Once the rocket 102 has landed on the cradle 114, a valve can be opened to allow the body of water 116 to flow into and flood the internal space within the bottom tank 134, so that the cradle 114 sinks in the body of water 116 until it rests at the bottom of the body of water 116. Thus, the rocket 102 can be stabilized after landing to allow it to be more easily removed from the stabilization system 100.

The stabilization system 100 can allow the rocket 102 to land without using landing gear and thus the rocket 102 can omit landing gear. The large body of water 116 can help to dissipate heat from the rocket 102 and the cradle 114 as the rocket 102 lands, and in the event of a catastrophic failure or explosion of the rocket 102. Industrial shocks or springs can be incorporated into the stabilization system 100, such as between the funnels 118, 120 and the neck portion 126, to further cushion the rocket 102 as it lands. Retractable wheels can be incorporated into the stabilization system 100, such as on the underside of the cradle 114. Such wheels can be used to autonomously drive, move, or rotate the cradle 114 within the stabilization system 100, such as on a solid surface at the bottom of the body of water 116, to position the cradle 114 prior to the rocket 102 landing on the cradle 114. Once the wheels have been used to position the cradle 114 at a desired location and orientation, the wheels can be retracted up into the cradle 114 so that the cradle 114 floats in the body of water 116, as described above.

Aspects, features and/or techniques of the various embodiments described above can be combined to provide further embodiments. In addition, aspects of the embodiments can be modified, if necessary to employ concepts of U.S. Pat. No. 8,678,321, and U.S. provisional patent application No. 62/153,433, filed Apr. 27, 2015, to which this application claims priority, which are both incorporated herein by reference in their entireties, to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:
1. A rocket landing stabilization system for stabilizing a rocket as it lands, comprising:
   a stabilization structure including:
      a first lateral support element;
      a second lateral support element spaced apart from the first lateral support element;
      a first stabilization element coupled to the first lateral support element and coupled to the second lateral support element; and a second stabilization element coupled to the first lateral support element and coupled to the second lateral support element;

a first hook coupled to the rocket; and a second hook coupled to the rocket;

wherein the first and second hooks are configured to catch on the first and second stabilization elements, respectively, as the rocket lands.

2. The rocket landing stabilization system of claim 1 wherein the first stabilization element is adjustable with respect to the second stabilization element along the first lateral support element and along the second lateral support element.

3. The rocket landing stabilization system of claim 1 wherein the first lateral support element is coupled to a first upright support structure and the second lateral support element is coupled to a second upright support structure.

4. The rocket landing stabilization system of claim 3 wherein the first and second upright support structures are columns.

5. The rocket landing stabilization system of claim 3 wherein the first and second upright support structures are walls.

6. The rocket landing stabilization system of claim 1, further comprising a body of water under the stabilization structure.

7. The rocket landing stabilization system of claim 1, wherein the first and second hooks each extend laterally away from a main body of the rocket.

8. The rocket landing stabilization system of claim 1, wherein the rocket does not include landing gear configured to support the rocket on a ground surface.

9. A method of stabilizing a landing rocket, comprising:
landing the rocket between a first stabilization element and a second stabilization element, wherein the first stabilization element is coupled to a first lateral support element and coupled to a second lateral support element spaced apart from the first lateral support element, and wherein the second stabilization element is coupled to the first lateral support element and coupled to the second lateral support element;

catching a first hook coupled to the rocket on the first stabilization element; and catching a second hook coupled to the rocket on the second stabilization element.

10. The method of claim 9, further comprising moving the first stabilizing element toward the second stabilizing element.

11. The method of claim 9, further comprising using the first and second hooks to guide descent of the rocket as it lands.

12. The method of claim 9 wherein the rocket does not directly contact the landing site as it lands.

13. The method of claim 9 wherein catching the first and second hooks on the first and second stabilization elements includes cradling the rocket on the first and second stabilization elements.

14. The method of claim 9 wherein the first stabilization element is coupled to a first lateral support element by a first clutch system and coupled to a second lateral support element spaced apart from the first lateral support element by a second clutch system, and wherein the second stabilization element is coupled to the first lateral support element by a third clutch system and coupled to the second lateral support element by a fourth clutch system, and wherein the method further includes feeding out additional length of the first and second stabilization elements as the rocket lands to soften the catching of the first and second hooks on the first and second stabilization elements.

\* \* \* \* \*